United States Patent [19]
Rauwendaal

[11] Patent Number: 5,932,159
[45] Date of Patent: Aug. 3, 1999

[54] SCREW EXTRUDER WITH IMPROVED DISPERSIVE MIXING

[75] Inventor: Chris J. Rauwendaal, Los Altos, Calif.

[73] Assignee: Rauwendaal Extrusion Engineering, Inc., Los Altos Hill, Calif.

[21] Appl. No.: 08/966,272

[22] Filed: Nov. 7, 1997

[51] Int. Cl.$^6$ .......................... B29C 47/60; B29C 47/62; B29C 47/66

[52] U.S. Cl. ............................... 264/211.21; 264/211.23; 264/349; 366/79; 366/81; 366/84; 366/85; 366/89; 366/300; 366/301; 366/318; 366/319; 366/322; 366/323; 366/324; 425/200; 425/204; 425/208; 425/209

[58] Field of Search .......................... 264/211.21, 211.23, 264/349; 425/200, 204, 208, 209; 366/79, 81, 84, 85, 89, 300, 301, 318, 319, 322, 323, 324

[56] References Cited

U.S. PATENT DOCUMENTS

| | | |
|---|---|---|
| 3,593,843 | 7/1971 | Hill . |
| 3,901,482 | 8/1975 | Kieffaber . |
| 3,989,941 | 11/1976 | Gasior et al. . |
| 4,092,015 | 5/1978 | Koch . |
| 4,173,417 | 11/1979 | Kruder . |
| 4,215,978 | 8/1980 | Takayama et al. . |
| 4,227,870 | 10/1980 | Kim . |
| 4,277,182 | 7/1981 | Kruder . |
| 4,363,768 | 12/1982 | Kruder . |
| 4,834,454 | 5/1989 | Nortey . |
| 5,035,509 | 7/1991 | Kruder . |
| 5,071,256 | 12/1991 | Smith et al. . |
| 5,332,309 | 7/1994 | Ramazzotti et al. . |
| 5,356,208 | 10/1994 | Tadmor . |
| 5,551,777 | 9/1996 | Tjahjadi et al. . |

OTHER PUBLICATIONS

Cheremisinoff, Nicholas P.; "Polymer Mixing and Extrusion Technology" (1987, Marcel Dekker, Inc.), pp. 372–375.
Levy, Sidney; "Plastics Extrusion Technology Handbook, second edition" (1989, Industrial Press Inc.), pp. 14–15 and 82–93.
Rauwendaal, Chris; "Polymer Extrusion, 3rd. rev. ed." (1994, Carl Hanser Verlag), pp. 322–323, 332–333, 416–417, and 432–433.

Primary Examiner—Leo B. Tentoni
Attorney, Agent, or Firm—Larry B. Guernsey; Michael J. Hughes

[57] ABSTRACT

A screw extruder (10), including a barrel (18) having a bore (26) which defines an inner surface (24). At least one extruder screw (28) is positioned within the bore (26), each screw (28) further including a central shaft (34) and at least one screw flight (30). Each screw flight (30) further includes a front pushing face (36) and a rear face (38). The profile (40) of each front pushing face (36) acts with the inner surface (24) of the barrel (18) to form a progressively narrowing passage (46) through which material is forced into multiple regions of high elongational and shear stress (48) which act to break down agglomerates of material and thus dispersively mix the material.

Also presented is a screw extruder (100) having a single screw (28) which includes dispersion disks (102) which are rotationally offset from one another and whose design is not constrained by interaction with a second disk, which provides improved distributive and dispersive mixing.

Also presented is a method of extruding material using a screw extruder (10) having pushing face (36) profiles (40) which form progressively narrowing passages (46) in conjunction with the barrel (18) inner surfaces (24) to provide improved dispersive mixing.

24 Claims, 13 Drawing Sheets

FIGURE 2 A-J Prior Art

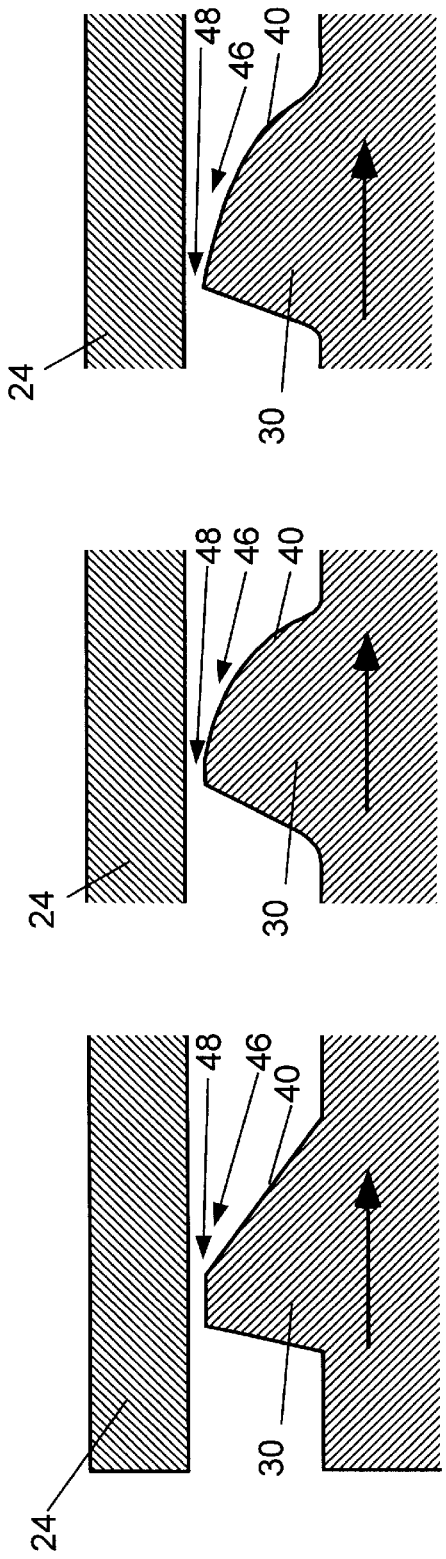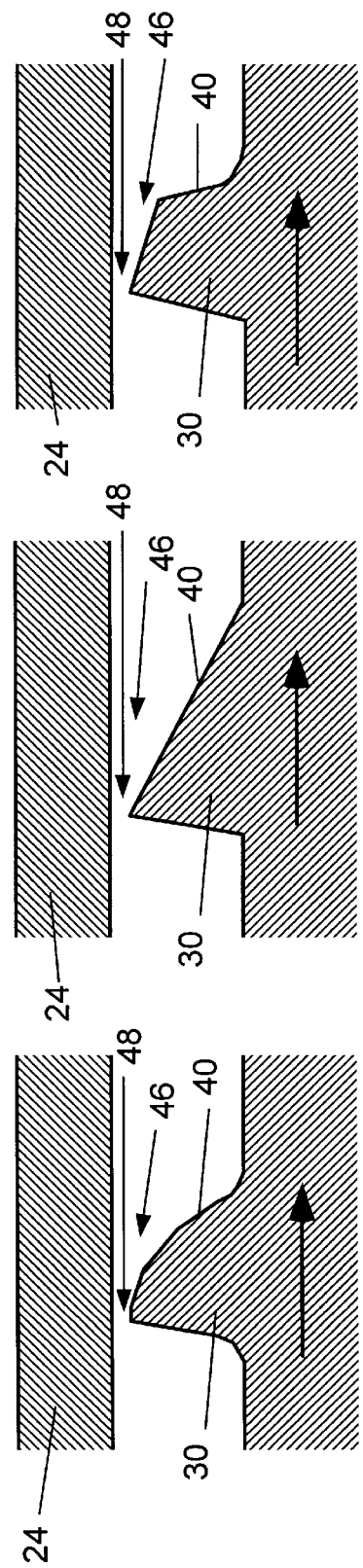
FIGURE 5 A-F

Prior Art  Prior Art

SCREW EXTRUDER WITH IMPROVED DISPERSIVE MIXING

TECHNICAL FIELD

The present invention relates generally to machines for extrusion of materials and more particularly to screw extruders adapted for use with plastics and plastic-like materials. The inventor anticipates that primary application of the present invention will be for the manufacture of color concentrates, polymer blends, and polymer alloys.

BACKGROUND ART

A screw extruder is a machine in which material, usually some form of plastic, is forced under pressure to flow through a contoured orifice in order to shape the material. Screw extruders are generally composed of a housing, which is usually a cylindrical barrel section, surrounding a central motor-driven screw. At a first end of the barrel is a feed housing containing a feed opening through which new material, usually plastic particles, is introduced into the barrel. The screw contains raised portions called flights having a larger radial diameter than the screw's central shaft and which are usually wrapped in a helical manner about the central shaft. The material is then conveyed by these screw flights toward the second end of the barrel through a melting zone, where the material is heated under carefully controlled conditions to melt the material, and then passes through a melt-conveying zone, also called a pumping zone. The melted plastic is finally pressed through a shaped opening or die to form the extrudate.

Besides conveying material toward the die for extrusion, the screw is depended upon to perform mixing of the feed material. Very generally, mixing can be defined as a process to reduce the non-uniformity of a composition. The basic mechanism involved is to induce physical motion in the ingredients. The two types of mixing that are important in screw extruder operation are distribution and dispersion. Distributive mixing is used for the purpose of increasing the randomness of the spatial distribution of the particles without reducing the size of these particles. Dispersive mixing refers to processes that reduce the size of cohesive particles as well as randomizing their positions. In dispersive mixing, solid components, such as agglomerates, or high viscosity droplets are exposed to sufficiently high stresses to cause them to exceed their yield stress, and they are thus broken down into smaller particles. The size and shape of the agglomerates and the nature of the bonds holding the agglomerate together will determine the amount of stress required to break up the agglomerates. The applied stress can either be shear stress or elongational stress and generally, elongational stress is more efficient in achieving dispersion than is shear stress. An example of dispersive mixing is the manufacture of a color concentrate where the breakdown of pigment agglomerates below a certain critical size is crucial. An example of distributive mixing is the manufacture of miscible polymer blends, where the viscosities of the components are reasonably close together. Thus, in dispersive mixing, there will always be distributive mixing, but distributive mixing will not always produce dispersive mixing.

In extrusion processes, the need for good dispersive mixing is often more important than for distributive mixing. This is particularly true in the extrusion of compounds which contain pigments which must be uniformly mixed or small gage extrusion such as spinning of fibers or extrusion of thin films.

In screw extruders, significant mixing occurs only after the polymer has melted. Thus, the mixing zone is thought of as extending from the start of the melting zone to the end of the extrusion die. Within this area there will be considerable non-uniformities in the intensity of the mixing action and the duration of the mixing action, both in the barrel section and in the extrusion die. In molten polymer, the stress is determined by the product of the polymer melt viscosity and rate of deformation. Therefore, in general, dispersive mixing should be done at as low a temperature as possible to increase the viscosity of the fluid, and with it, the stresses in the polymer melt.

Fluid elements are spoken of as having a "mixing history", which refers to the amount of elongational and shear stress to which it has been exposed, and the duration of that exposure. A polymer that melts early in the mixing zone process will have a more significant mixing history than one that melts near the end of the melting zone.

Generally, in an extruder with a simple conveying screw the level of stress or the fraction of the fluid exposed to it is not high enough to achieve good dispersive mixing. Distributive mixing is easier to achieve than dispersive mixing, but unmodified screws have also been found to produce inadequate distributive mixing for many applications. Therefore, numerous variations in screw design have been attempted in prior inventions to increase the amount of distributive or dispersive mixing in screw extruders. These devices usually contain a standard screw section near the material input hopper, and one or more specially designed sections to enhance mixing. These mixing sections naturally fall into the categories of distributive and dispersive mixing elements.

Varieties of distributive mixing elements are shown in FIG. 2 A–F. Practically any disruption of the velocity profiles in the screw channel will cause distributive mixing. Thus even simple devices, such as the placement of pins (see FIG. 2A) between the screw flights can enhance distributive mixing. FIG. 2B shows the well-known Dulmage mixing section, in which the polymer flow is divided into many narrow channels, which are combined and divided again several times. The Saxton mixing section (FIG. 2C) and the "pineapple" mixing section (FIG. 2D) are used to produce similar results. FIG. 2E shows a screw which has slots cut into the flights. A variation called the Cavity Transfer Mixer is shown in FIG. 2F. There are cavities both in the rotor and the barrel. This type of device reportedly performs both dispersive and distributive mixing.

In addition to these devices, static mixers are often used to divide and recombine the melt stream to intermingle the material and eliminate variations in temperature, composition and mixing history. These generally do not provide regions of high stress, and are thus mostly used for distributive mixing.

The devices shown in FIG. 2A–F have been primarily classified as distributive mixers because their action is mainly to spatially redistribute material without subjecting it to regions of high shear stress. The variations shown in FIG. 2G–J are designed to include high shear stress regions and thus perform dispersive mixing.

The most common dispersive mixing section is the fluted or splined mixing section in which one or more barrier flights are placed along the screw so that material has to flow over them. In passing through the barrier clearance, the material is subjected to a high shear rate which acts to break up agglomerates. One such device is the Maddock mixing section, which is shown in FIG. 2G. The Maddock has longitudinal splines that form a set of semicircular grooves. Alternate grooves are open on the upstream and downstream ends. Material that enters the inlet grooves is forced to pass over the mixing flights, which are shown as cross hatched areas, before reaching the outlet grooves. While passing over the mixing flights, the material is subjected to high shear stress. The disadvantage of this type of mixing element is that it reduces the pressure at the output side of the mixing section and thus reduces the output of the extruder. Also there may be regions in which material may stagnate since the grooves have constant depth in a longitudinal direction. This makes it less suitable for materials of limited thermal stability.

FIG. 2H shows the Egan mixing section, which has splines that run in a helical direction to form channels separated by mixing barriers. These channels can have a gradually reducing depth, tapering to zero depth at the end of the mixing section, which reduces the chance of stagnation points. This helical design consumes less pressure than the Maddock style, thus producing less reduction in extruder output.

A blister ring, shown in FIG. 2J, is simply a cylindrical section on the screw that has a small radial clearance, through which all material must pass. This can cause a large pressure drop on the output side of the blister ring, resulting in a significant reduction in overall extruder output.

Screw extruders can have more than one central screw. Twin-screw extruders may operate with two screws that may either rotate in the same direction, or they may be counter-rotating. There are some machines that use more than two screws.

In counter-rotating twin-screw extruders, dispersive mixing primarily occurs in the intermeshing region between the screws. This action is similar to that in a two-roll mill. This configuration has the disadvantage that the mixing action creates substantial separating forces on the screws. These forces can push the screws against the barrel, if these forces grow too great. This can cause wear on the screws and the barrel, thus the screw speed has to be kept low, with resulting decrease in the throughput of the extruder.

In intermeshing co-rotating twin-screw extruders, the screw surfaces in the intermeshing region move in opposite directions. As a result, most of the material bypasses the intermeshing region and moves from one screw to the other repeatedly.

Some twin screw machines have kneading blocks included to increase dispersive mixing. These kneading blocks are most commonly flat paddles of roughly elliptical shape which are stacked on a central shaft, but offset at varying angles. Each paddle on the shaft is paired with a corresponding paddle on the second shaft. The shafts usually both rotate in the same direction but with the angular orientation of the paddles staggered at a certain angle. We can consider the elliptical paddle shapes to have a major and a minor axis with a "tip" on each end of the major axis and a "mid-point" at each end of the minor axis. At one point in the rotation cycle, a tip of a paddle on the first shaft, when horizontally oriented, will nearly contact the midpoint of a paddle on the second shaft, whose tip will then be vertical. As this second, vertical tip rotates towards horizontal, the first tip traces along the elliptical outline of the second paddle, thus "wiping" it. At a further point in the rotation cycle, the second paddle wipes the outline of the first. This wiping action keeps material from stagnating or collecting on the paddle edges. It also imposes constraints on the shapes of the paddles, as the travel of the tip of the neighboring paddle defines the outline of the paddle itself. Although this configuration of paddles can produce fairly good elongational stress in material, the above constraint on the shape of the paddles prevents variations in design, which may produce even better elongational stress regions.

In general, twin-screw extruders are considered to be better at dispersive mixing than single-screw extruders. However for a given capacity, multi-screw machines are usually considerably more costly than single-screw extruders.

For improved mixing to occur, there are several important aspects to be considered. In dispersive mixing, it is the passage of material through a region of high stress that produces the desired breakdown of agglomerates. A single pass through a high stress region will likely achieve only a single rupture of the agglomerate. To achieve a fine scale of dispersion, multiple passes and ruptures may be necessary. Also, for efficient dispersive mixing, stresses in the high stress region should have a strong elongational component, as well as a shear component. For efficient operation of the extruder as a whole, a low pressure drop across the mixing section is desirable. It is also important to combine dispersive and distributive mixing to achieve a more uniform overall mixture. Some distributive mixing occurs whenever dispersive mixing is done, but by deliberately combining distributive elements with the dispersive elements, chances are improved that all fluid elements will pass through the high stress region, preferably many times, for proper dispersion.

To make sure that all agglomerates and droplets pass through high stress regions at least once, the flow rate through the high stress regions must be large enough compared to the overall forward flow rate. This can be done by designing the number of high stress regions, their length and the size of the gap through which material will pass. It is also preferable that there be more than one high stress region, and that these regions are symmetrically arranged around the circumference of any section along the length of the screw, so that forces will be balanced and the possibility of deflection of the screw will be minimized. To reduce pressure drop in the mixing section, it is desirable to have the high stress regions in a forward helical orientation, which can be done by a continuous forward helix or in a stepped forward helix with kneading disks.

For the foregoing reasons, there is a great need for a screw extruder which provides better dispersive mixing than in presently available extruders.

DISCLOSURE OF INVENTION

Accordingly, it is an object of the present invention to provide a screw extruder which provides improved dispersive and distributive mixing.

Another object of the present invention is to provide a screw extruder in which material is repeatedly passed through regions of high stress for better break-down of agglomerates into smaller particles.

And, another object of the invention is to provide a screw extruder having a number of high stress regions which produce high elongational stress as well as shear stress.

Yet another object of the invention is to provide a single screw extruder which is less costly to manufacture for its capacity than a multi-screw extruder, but which provides dispersive mixing comparable or better than conventional multi-screw extruders.

A further object of the present invention is to provide a screw extruder in which the high stress regions do not produce a large pressure drop which may impede overall throughput.

A still further object of the present invention is to provide a screw extruder that has symmetrically balanced high stress regions which avoid possible deflection of the central screw.

A yet further object of the present invention is to provide a multi-screw extruder that provides improved dispersive mixing over present multi-screw extruders.

An additional object is to provide a screw extruder with modular, exchangeable mixing sections.

A further additional object is to provide a single screw extruder with kneading paddles whose design geometry is not constrained as in twin screw extruders, and which provides improved dispersive and distributive mixing.

Briefly, one preferred embodiment of the present invention is a screw extruder including a barrel having a bore that defines an inner surface. At least one extruder screw is positioned within the bore, each screw further including a central shaft and at least one screw flight. Each screw flight further includes a front pushing face and a rear face. The profile of each front pushing face acts with the inner surface of the barrel to form a progressively narrowing passage through which material is forced into multiple regions of high elongational and shear stress which act to break down agglomerates of material and thus dispersively mix the material.

A second preferred embodiment of the present invention is a screw extruder having a single screw which includes dispersion disks which are rotationally offset from one another and whose design is not constrained by interaction with a second disk to provide improved distributive and dispersive mixing. There may also be transition disks between the dispersion disks.

A third preferred embodiment of the present invention is a screw extruder having kneading paddles which include at least one dispersion groove which channels material into regions of high stress.

A fourth preferred embodiment of the present invention is a screw extruder having at least one extruder screw that has at least one fluted mixing section. Each mixing section further has inlet and outlet sections which are separated by a plurality of barrier flights which act to force material through regions of elongational and shear stress.

A fifth preferred embodiment of the present invention is a screw extruder having defined a flight clearance $\delta$ a channel depth H, a helix angle $\phi$, a mixing section length L, a screw diameter D, a flight tip width $w_f$, a channel width, where for a range of $\delta/H$ of 0.05–0.5, mixing section length L lies in the range 1–20 times the screw diameter D, the helix angle $\phi$ lies in the range from $-90°$ to $-30°$ and $+30°$ to $+90°$, the flight tip width $w_f$ lies in the range 0–0.5 times the channel width and the $\delta/D$ ratio lies in the range of 0.005–0.250.

Also presented is a method of extruding material using a screw extruder having pushing face profiles that form progressively narrowing passages in conjunction with barrel inner surfaces to provide improved dispersive mixing.

The described versions of the present invention have many advantages which address the above-mentioned objects. One such advantage of the present invention is that provides both good dispersive and good distributive mixing.

Another advantage of the invention is that it provides regions of both high elongational and shear stress.

A further advantage of the present invention is that material is repeatedly passed through regions of high stress for improved breakdown of material agglomerates.

Yet another advantage of the invention is that it may be used in a single-screw extruder, which is less costly for its capacity than a comparable twin screw extruder, yet may provide comparable or better dispersive mixing.

A still further advantage of the present invention is that the high stress regions may be in a forward helical orientation, thus reducing pressure drop in the mixing section, and therefore enhancing overall efficiency and throughput.

A yet further advantage of the present invention is that the high stress regions are symmetrically arranged around the central screw, so that deflection is minimized.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIGS. 2A–J illustrates a variety of prior art mixing sections for distributive and dispersive mixing;

FIGS. 5A–F shows a variety of flight face profiles which embody the present invention;

BEST MODE FOR CARRYING OUT THE INVENTION

Figure 1:
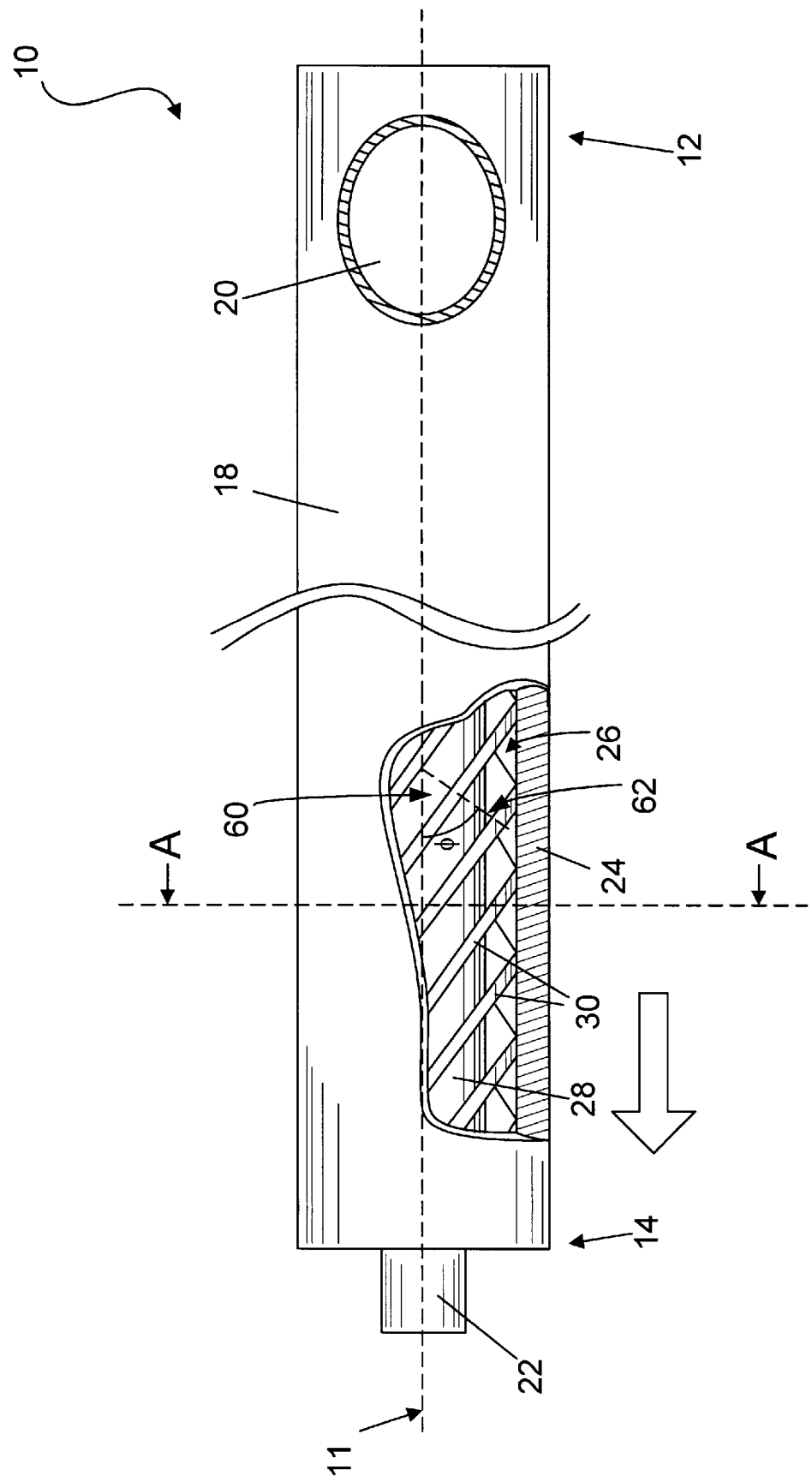
FIG. 1 is an overhead view of a simplified screw extruder, in which a portion of the barrel has been cut-away.

A preferred embodiment of the present invention is a screw extruder having improved dispersive mixing. As illustrated in the various drawings herein, and particularly in the view of FIG. 1, a form of this preferred embodiment of the inventive device is depicted by the general reference character 10.

FIG. 1 illustrates the major portions of a screw extruder 10, having a central longitudinal axis 11, and which also has an input end 12 and an output end 14.

Generally, for convenience of reference, the terms "downstream" shall refer to those ends closest to the output portion of the screw extruder and the term "upstream" shall refer to those ends farthest away from the output. The downstream direction is indicated by a large arrow, which shows the direction of material flow. The screw extruder 10 has a barrel 18. The input end 12 includes an input hopper 20 for feeding in material, and an extrusion die 22 on the output end 14. A portion of the barrel 18 has been cut away to show the barrel wall 24, and an inner bore 26. Positioned within the bore 26 is an extrusion screw 28 having screw flights 30. Although this version of the preferred embodiment has a single screw, it is to be understood that the screw extruder could contain two or more screws.

FIG. 2 illustrates a variety of prior art mixing sections of extruder screws, as discussed above in the Background Art section.

Figure 3:
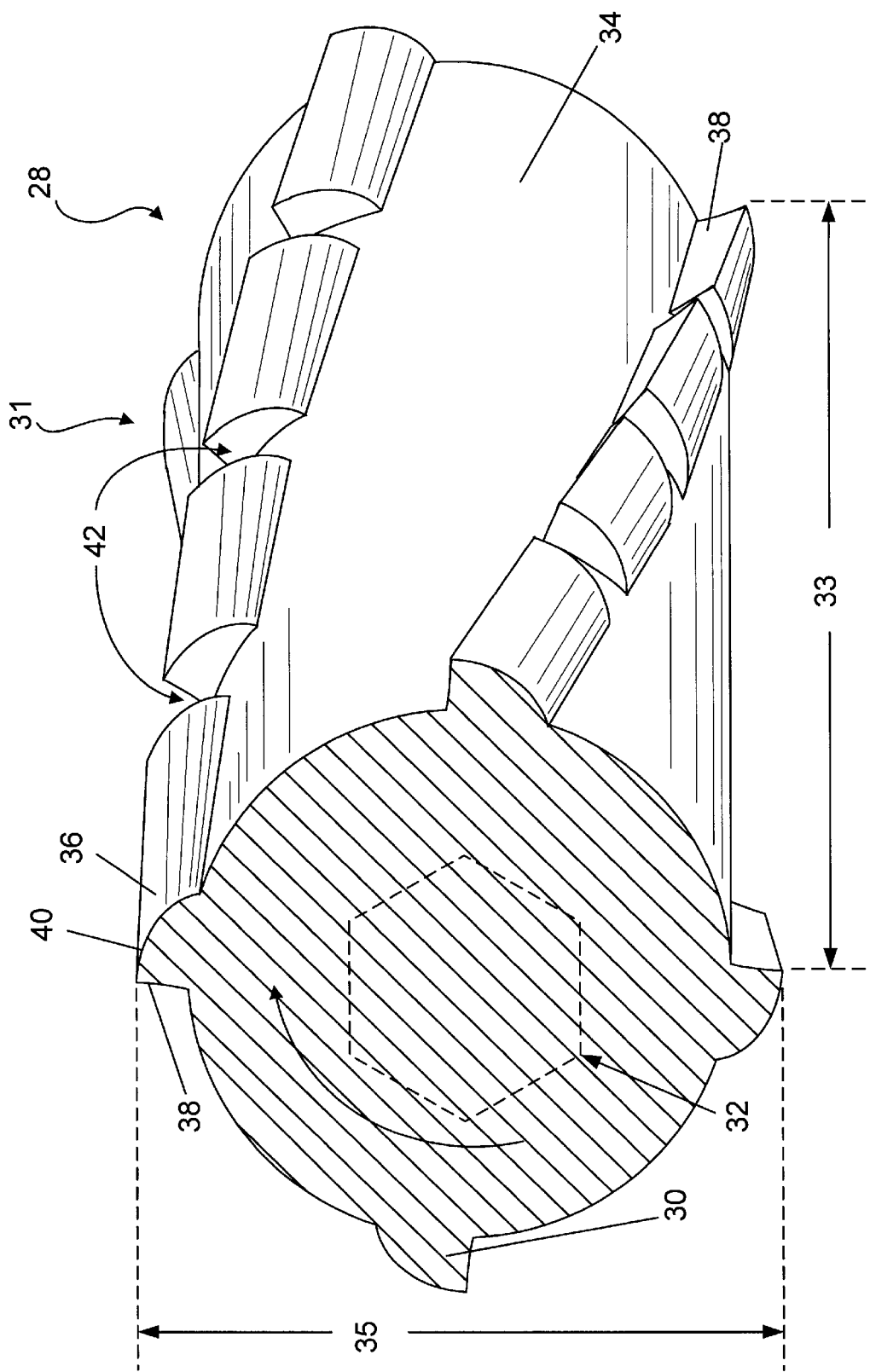
FIG. 3 shows an isometric view of an extruder screw according to one embodiment of the present invention.

FIG. 3 illustrates an isometric cross-sectional view of one version of a mixing section of an extruder screw 28 used in the present invention. The general reference character 31 designates the mixing section of the extruder screw 28. This mixing section can be an integral portion of the overall screw 28, or it may be a modular section which is combined with other modular sections upon a central shaft to provide varying characteristics which can be customized for different materials and applications. In FIG. 3, an optional central bore 32 is shown in phantom line for the case where mixing section 31 is a modular section which can be stacked upon an independent central shaft. This mixing section is defined as having a length (L) 33. The mixing section 32 includes a central shaft 34 and screw flights 30, which are used to mix the material as well as convey it forward. A screw diameter (D) 35 is defined as the tip to tip distance between flights 30 when positioned on opposite sides of the central shaft 34. An arrow is included to indicate the direction of rotation. The flights 30 include the forward pushing face 36, and the rear face 38. Reference character 40 will be used to refer to the cross-sectional profile of the flight 30. As will be seen below, it is the shape of this profile 40 that produces the multiple regions of high elongational and shear stress, which are crucial in producing increased dispersive mixing. In this version of the preferred embodiment, slots 42 have been provided to increase distributive mixing. These slots 42 are optional, and their size and placement are subject to considerable variation, as will be apparent to one skilled in the art. Additionally, many other distributive mixing devices may be used, including, but not limited to, pins or protrusions which could be round, square, diamond shape or irregular, secondary flights with interruptions, and changes in channel depth or width (defined below).

Figure 4:
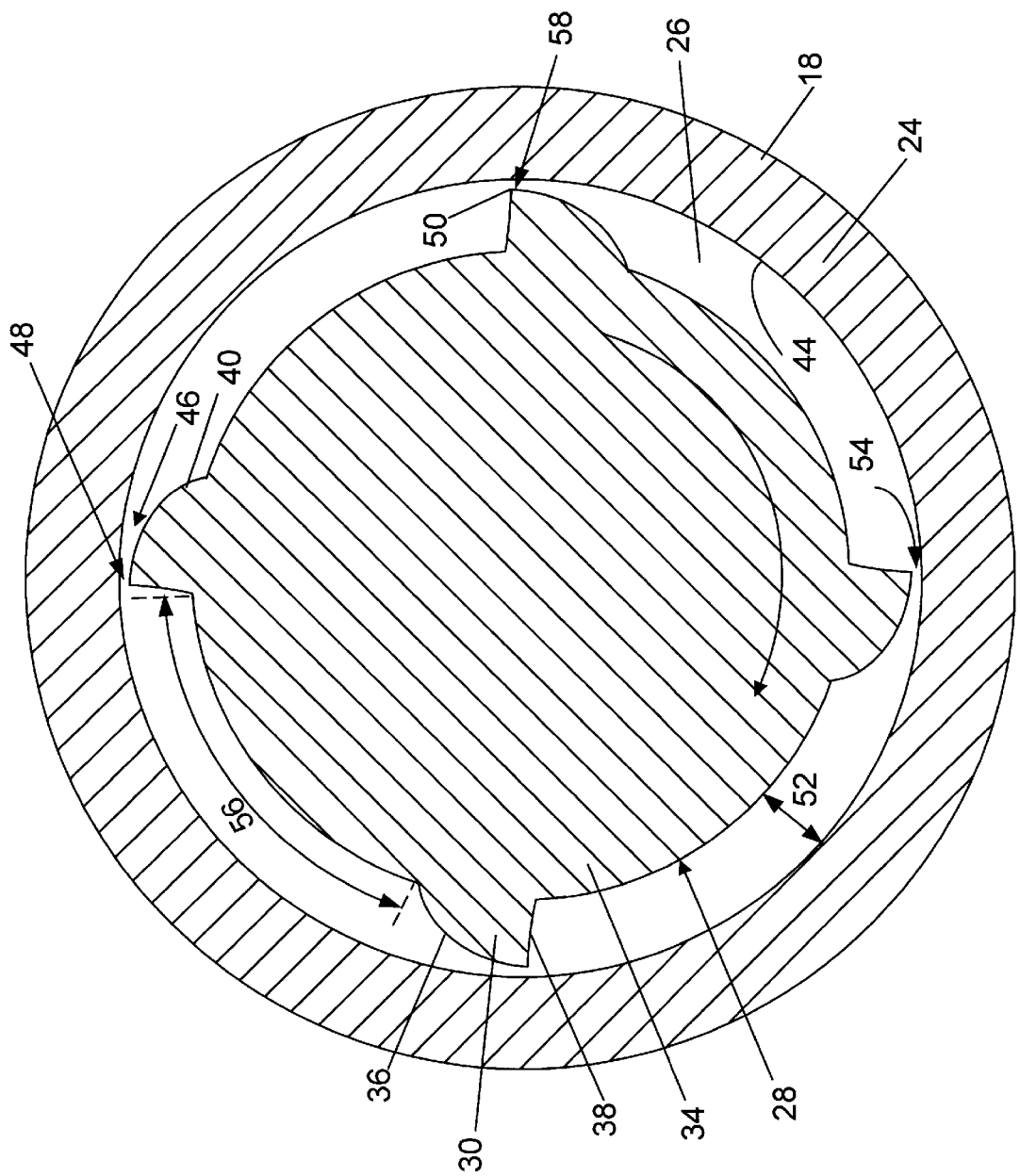
FIG. 4 illustrates a cross-sectional view taken through the screw extruder along line A—A in FIG. 1.

FIG. 4 shows a cross-sectional view through the screw extruder 10 along line A—A in FIG. 1. Barrel 18 includes the barrel wall 24 surrounding a central bore 26 which is defined by the barrel inner surface 44. In this version of the preferred embodiment, the central bore 26 is cylindrical and accommodates a single extruder screw 28, but it should be understood that the present invention can be used with two or more extruder screws, in which case, the bore 26 cross-section may resemble multiple overlapping circles or ellipses.

The flights 30 of the screw 28 are shown, and in this version of the preferred embodiment there are four flights which are positioned at 90° degree intervals around the circumference of the central shaft 34. It is to be understood that other numbers of flights such as two, three, five, six, etc. may be used, and their positions around the circumference of the shaft 34 is likewise variable. It is desirable, however, that the flights 30 be symmetrically arranged around the shaft 34 circumference in order that the forces on the shaft 34 are balanced and deflection is minimized. The front pushing faces 36 and the rear faces 38 of the flights 30 are shown, as well as the flight profile 40. The front pushing faces 36 and the inner surface of the barrel 44 define a progressively narrowing passage 46 into which the material in the bore 26 moves. The rotational movement of the screw 28 causes the material to enter the large end of the passage 46 and to be squeezed as the passage 46 narrows into high stress regions 48, which are created between the flight tips 50 and the barrel inner surface 44. The reducing cross sectional area of the progressively narrowing passage 46 causes an increase in the average flow velocity. Thus the high stress regions 48 develop both elongational and shear stresses which are important in providing increased dispersive mixing. The action of the screw 28 rotation ensures that material agglomerates passes through many of these high stress regions 48, and thus very high quality dispersive mixing may be obtained.

The distance between the barrel inner bore 44 and the central shaft 34 will define the channel height (H) 52. The distance between the flight tip 50 and the barrel inner bore 44 is defined as the radial flight clearance ($\delta$) 54. The ratio of the flight clearance 54 to the channel height 52 is defined as $\delta/H$. The distance between the forward pushing face 36 of one flight 30 and the rear face 38 of the next flight 30 on the extruder screw measured circumferentially will be referred to as the channel width 56. Additionally, the width of the tip of the flight ($w_f$) will be designated as 58, although it is quite possible that this $w_f$ 58 may be zero, depending on the flight face profile 40. Indeed, the profile shown in FIG. 4 is a smooth curve at the tip 50 and thus the flight tip width 58 is zero in this case.

FIG. 5 shows a variety of pushing face profiles 40 of the screw flights 30 which can be used in conjunction with the barrel wall 24 to produce progressively narrowing passages 46 to force material into high stress regions 48. It should be understood that many other variations in profile are possible, and the present invention is not limited to the profiles shown.

The versions of the preferred embodiment discussed so far have had a "positive helix angle" or forward flighted configuration. In a forward flighted screw, the pushing flight face moves the material forward toward the output end of the extruder. Returning to FIG. 1, a positive helix angle ($\phi$) 60 can be seen as measured between a perpendicular to the flight face 62 and the longitudinal axis 11. It is also possible to have a rearward flighted configuration. In this case, the pushing flight face moves the material backward toward the feed opening of the extruder. It is also possible to have a neutral flight configuration. In this case, the flight angle is ninety degrees, and the pushing flight face moves the material only in the circumferential direction.

In a screw extruder 10, it is possible to have a mixing section that contains a negative helix angle. The sections of the screw which are upstream from the mixing section may still have a positive helix angle in order to make sure that the material is conveyed toward the output end 14 effectively. Thus it should be understood that the present invention 10 may be practiced with variations which include negative helix angles. It is anticipated that the extruder screw 28 may be made to be "modular", having a central shaft upon which mixing sections of varying geometry may be stacked to be adaptable to various materials and operations.

Figure 2A:
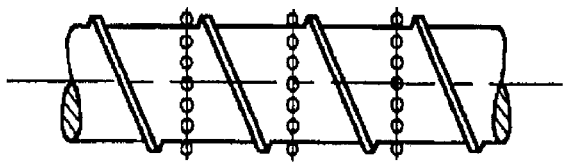
Figure 2B:
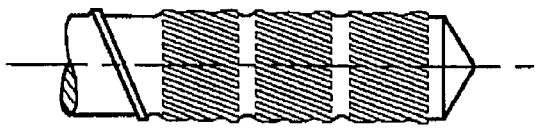
Figure 2C:
Figure 2D:
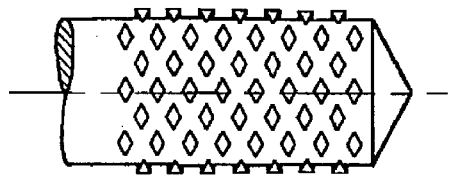
Figure 2E:
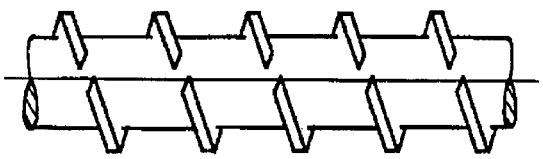
Figure 2F:
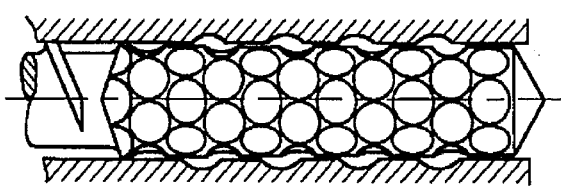
Figure 2G:
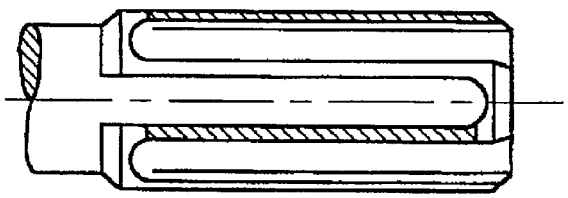
Figure 2H:
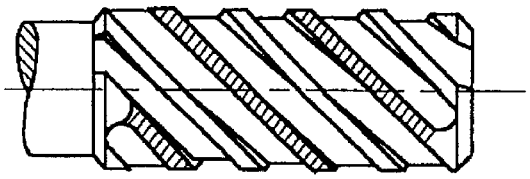
Figure 2J:
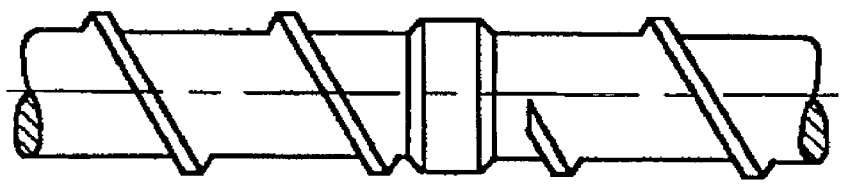
Figure 6:
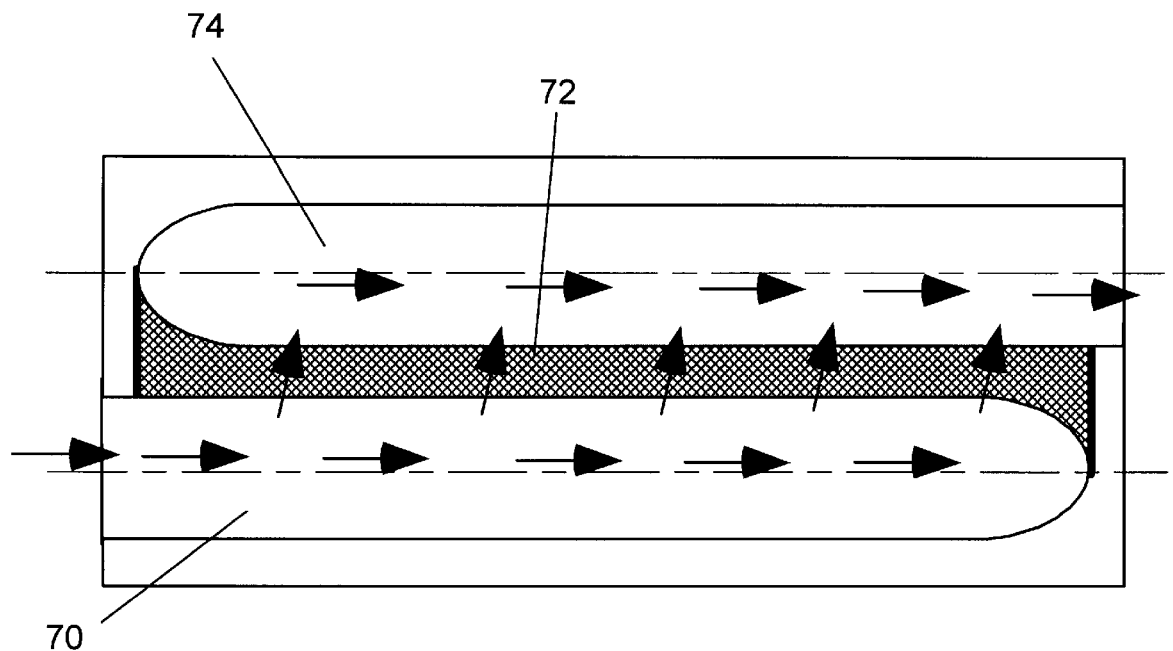
FIG. 6 illustrates a plan view of a prior art mixing section corresponding to a detailed view of the prior art mixing section seen above in FIG. 2G.

One type of modular mixing section which may be employed is the Maddock mixing section, which was discussed in the background art section and shown in FIG. 2G. FIG. 6 PRIOR ART shows a Maddock mixing section in more detail. The Maddock has longitudinal splines that form a set of semicircular grooves. Alternate grooves are open on the upstream and downstream ends. Material that enters the inlet grooves 70 is forced to pass over the mixing barrier flights 72, which are shown as cross hatched areas, before reaching the outlet grooves 74. While passing over the mixing flights 72, the material is subjected to high shear stress. This can produce some dispersive mixing, but this prior art mixing section only subjects material to a single pass through the high stress region.

Figure 7:
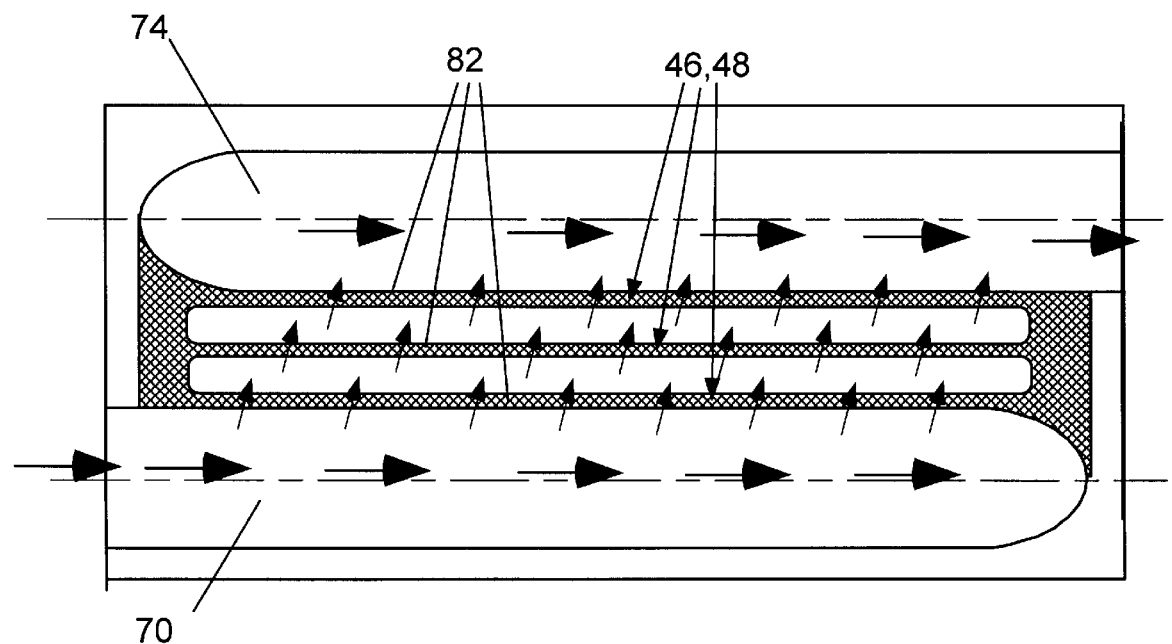
FIG. 7 shows a plan view of an improved mixing section according to an embodiment of the present invention.

In contrast, FIG. 7 shows another preferred embodiment of the present invention in which a multi-flight mixing section 80 can be incorporated in a modular fashion to a screw extruder. Material is introduced through the inlet grooves 70 as before, but must pass over a series of mixing barrier flights 82 before reaching the outlet grooves 74. In passing over this series of flights 82, the material must repeatedly pass through high stress regions. Additionally, the barrier flights 82 can include a number of progressively narrowing passages 46 to produce regions of high elongational stress 48, thus achieving much better dispersive mixing.

It should be understood that the use of multiple mixing barriers can be used in many different configurations to improve dispersive mixing from that achieved by the prior art. A further example would be to improve the blister ring mixer seen in FIG. 2J of the prior art by using a series of small rings with wedge-shaped leading edges to create multiple high stress regions. Additionally, similar modifications can be made to all fluted mixers such as the Egan, (FIG. 2H), the Zorro, the Troester, etc.

In designing extruder screw mixing sections for good dispersive mixing, there are several variables which can be adjusted to optimize results. According to Tadmor and Manas-Zloczower, (Z. Tadmor and I. Manas-Zloczower, Advances in Polymer Technology, V.3, No.3 , 213–221 (1983)), the passage distribution function can be written as:

$$G_k = \frac{\lambda^k e^{-\lambda}}{k!}$$

where k is the number of passes through the clearance, the dimensionless time $\lambda = t_r/\bar{t}$ is the ratio of the residence time $t_r$ and the mean residence time of the controlled volume $\bar{t}$. The residence time for a Newtonian fluid can be approximated as follows:

$$t_r = \frac{2z}{v_{bz}(1-r)}$$

where z is the helical length of the screw section considered, $v_{bz}$ the down-channel barrel velocity, and r the throttle ratio (pressure flow rate divided by drag flow rate). The mean residence time can be determined from:

$$\bar{t} = \frac{2WH}{\delta v_{bx}\left(1 + \frac{W}{w_f}\frac{\delta^2}{H^2}\right)}$$

where W is the channel width, H the channel depth, $\delta$ the radial flight clearance, and $w_f$ the flight width. The dimensionless time can be written as:

$$\lambda = \frac{L\delta\left(1 + \frac{W}{w_f}\frac{\delta^2}{H^2}\right)}{WH(1-r)\cos\phi}$$

where L is the axial length corresponding to down-channel distance z. The fraction of the fluid experiencing zero passes through the clearance is:

$$G_0 = e^{-\lambda}$$

The $G_0$ fraction should be low to make sure that most of the fluid experiences at least one or more passes through the clearance. In a simple conveying screw the $G_0$ fraction is usually around 0.99, which means that most of the fluid passes through the extruder without ever passing through the clearance. The expressions above can be used to determine the minimum value that will yield a $G_0$ less than 0.01, meaning that less than one percent of the fluid will not pass through the clearance at all. This is achieved when the dimensionless time $\lambda > 4.6$. For certain values of L, H, W, r, $\phi$, $w_f$ we can then determine how large the flight clearance $\delta$ has to be to make $\lambda > 4.6$ or $G_0 < 0.01$.

When L=3W, r=0, and $\phi = 17.67°$, the ratio of $\delta/H$ has to be about 0.8 to achieve a $G_0 < 0.01$. Clearly, with such a high ratio of $\delta/H$ it will be almost impossible to create large stresses in the clearance and to accomplish effective dispersive mixing. From equation 4 it is clear what geometrical variables we have to change to achieve a low $G_0$ fraction at a small clearance. We can do this by 1) increasing L, the length of the mixing section, 2) increasing $\phi$, the helix angle, and 3) reducing $w_f$, the width of the flight.

If the helix angle is increased from 17.67 to 60 degrees with the other values being the same, the $\delta/H$ ratio has to be about 0.35 or greater for the $G_0$ fraction to be less than 0.01. This value is still rather larger, but substantially better than 0.8. The $\delta/H$ ratio can be further reduced by increasing the length of the mixing section or reducing the flight width or by increasing the helix angle even more. This procedure allows a first order determination of the design variables. Further refinement of the initial values can be obtained from computer simulation.

It is estimated that in prior art screw extruders with a simple conveying screw, $G_0$, the fraction of material that does not pass through the clearance, is typically 0.99. This means that a great deal of material never passes through high stress regions, and thus dispersive mixing is poor.

In the present invention, it is desired that $G_0$ is less than 0.01, and therefore greater than 99% of the material will pass through a region of high stress. It is anticipated from the above formulas that for this value of $G_0$, in order to achieve a $\delta/H$ ratio in a reasonable range of 0.05 to 0.3, the helix angle ($\phi$) will lie in the range of $-90°$ to $-30°$ and $+30°$ to $+90°$, the length of the mixing section (L) will lie in the range of 1 to 20 times the bore diameter, and the width of the screw flight at the tip ($w_f$) will lie in the range of 0 to 0.5 times the width of the channel.

It should be understood that although the preferred range of helix angles is −90° to −30° and +30° to +90°, values in the range from +30° to −30° will work as well.

Multiple passes through a high stress region are necessary to break down agglomerates. Thus even in mixing sections with very low values for $G_0$, there is no assurance that good dispersive mixing will be achieved. For example, in the Maddock prior art mixer, all the material has to pass through the high stress region, but it only passes through this region once, which is insufficient.

Another parameter of interest is the ratio of flight clearance to the screw diameter or $\delta/D$. This gives an indicator of how much material flows through the high stress regions, and thus is proportional to how well the material is dispersively mixed. The higher this number is, the better the dispersion can be expected. For prior art single screw extruders, this $\delta/D$ figure is typically 0.001, and for prior art twin screw extruders, this $\delta/D$ figure improves to 0.005. In contrast, the $\delta/D$ value for the various preferred embodiments of the present invention is 0.005 to 0.250. When the $\delta/D$ number becomes too high the stresses that will be generated may be too low to accomplish dispersive mixing. The clearance should be small enough to be able to generate high enough stresses but large enough to allow sufficient material to flow through it.

The flights of a screw extruder can convey material in the downstream direction and can also serve to prevent material from building up on the walls of the extruder barrel. This latter function is known as "wiping" and it is possible to have elements that perform this wiping separately from the function of conveying material, although typically the functions are combined. It is also possible that wiping and conveying can be performed by one set of screw flights, while mixing is done by a second set of flights. This second set of flights may be in a separate modular section, or in the same section by incorporating this second set of flights between the conveying/wiping flights. The mixing flights do not have to have the same helix angle as the conveying/wiping flights, and indeed it may be beneficial that they be different. The helix angle of the conveying flights can be chosen to give the best pumping action, while the helix angle for the mixing flights can be chosen to give the best dispersive mixing action. A functional separation of the two types of flights can thus be achieved, allowing optimization of the overall performance.

Figure 8:
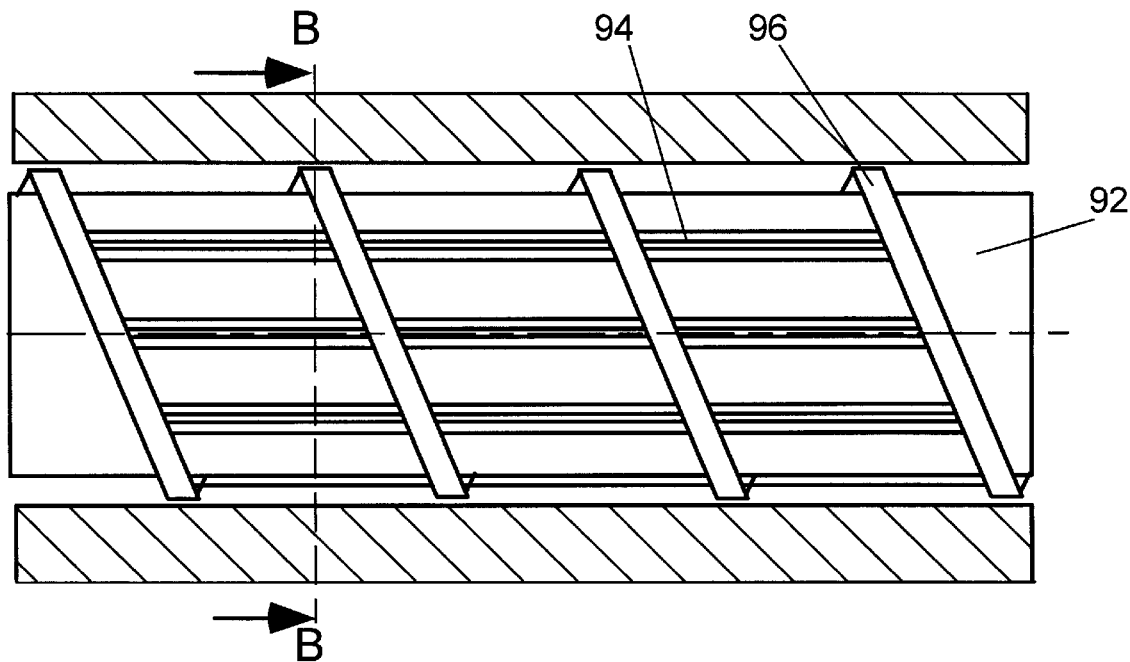
FIG. 8 is a side view of a screw extruder with a portion of the barrel removed to expose an extruder screw which has been formed according to the present invention.

FIG. 8 show a screw extruder 90 with a modified central screw 92 in which the mixing flights 94 are included between the conveying/wiping flights 96.

Figure 9:
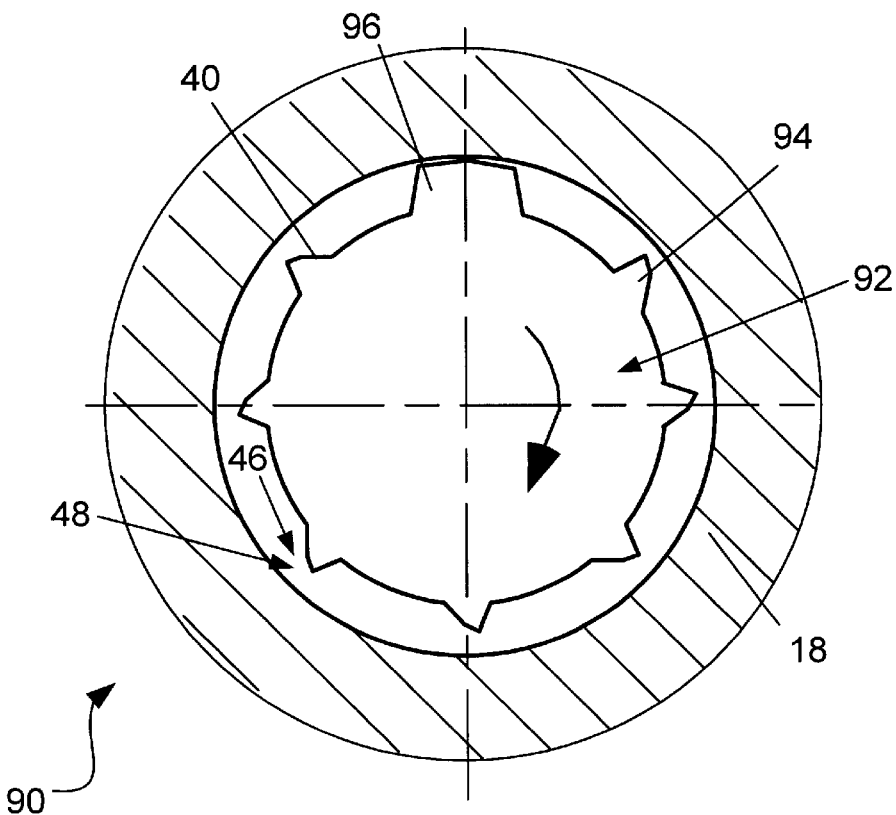
FIG. 9 is a cross-sectional view taken through the screw extruder along line B—B in FIG. 8.

FIG. 9 is a cross-sectional view of FIG. 8 taken through line B—B. The profile 40 of the mixing flights 94 can be seen to produce a progressively narrowing passage 46 in the barrel 18 which again forces material into regions of high stress 48. This configuration causes enhanced material dispersion while the wiping/conveying flight 96 has been designed for optimal pumping characteristics.

As mentioned above, it is also possible to have a variation in which the helix angle is ninety degrees. This is accomplished by using straight disks which are offset from each other at varying rotational angles. For a single screw extruder, this version of the preferred embodiment is similar to kneading paddles used in twin screw extruders, but with the important difference and advantage that the geometry of the disks can be optimized for production of effective elongational and shear stress, rather than being constrained by the need to trace the outline of a second screw.

Figure 11:
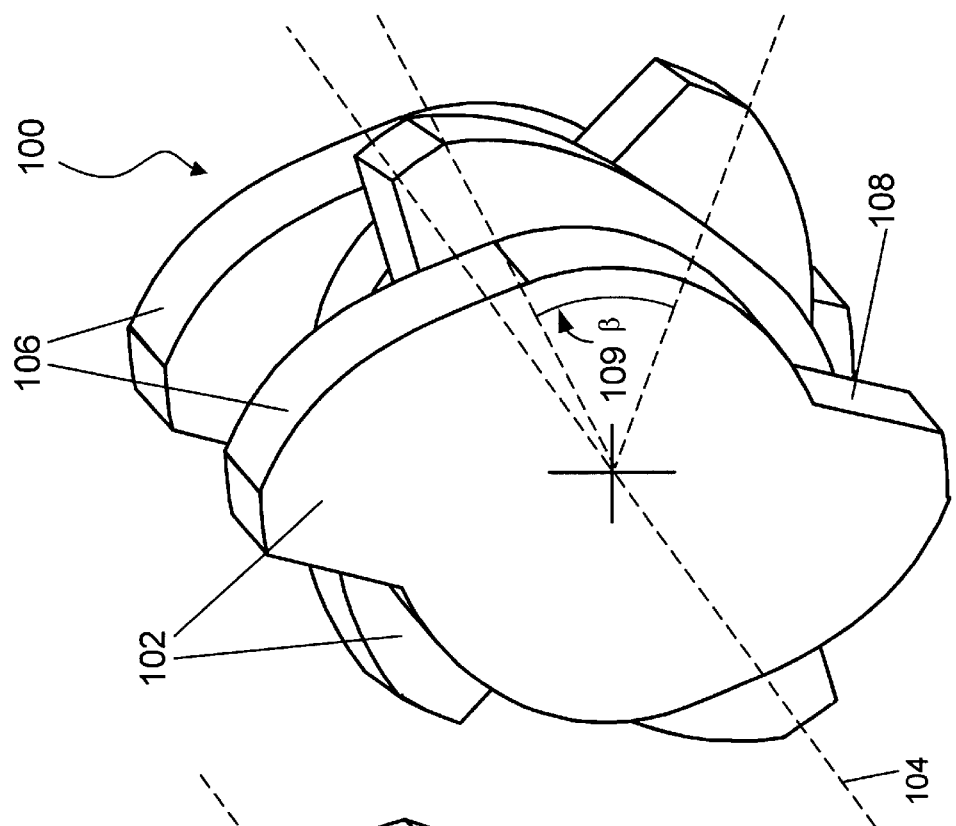
FIG. 11 illustrates a perspective view of dispersion disks, which are a preferred embodiment of the present invention.
Figure 10:
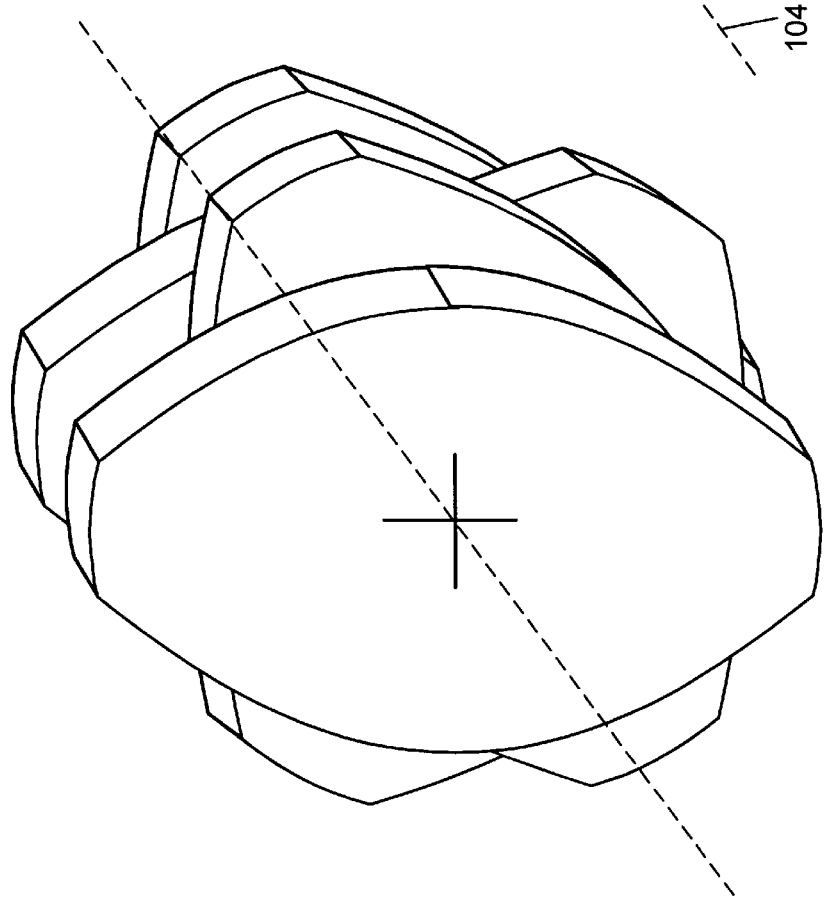
FIG. 10 shows a perspective view of prior art kneading paddles.

FIG. 10 Prior Art shows the configuration of the kneading paddles in one screw of a twin screw extruder as in the prior art. In contrast, FIG. 11 illustrates a second preferred embodiment 100 of the present invention for use in a single screw extruder having dispersion disks 102 aligned upon a central longitudinal axis 104. The pushing flight faces 106 have a pronounced wedge shape, and the trailing flight face 108 is flat. Stagger angle β 109 is shows the rotational offset of the successive disks. In a similar manner to that discussed above in regard to the profile of the pushing flight faces 30 in the positive helix angle embodiment, the profiles of the pushing faces 106 of the dispersion disks 102 are capable of much variation, such as elliptical sections, triangles, circular sections, etc. Additionally, these dispersion disks 102 may also be modular, and may be stacked upon a central shaft to provide various mixing characteristics.

Figure 12:
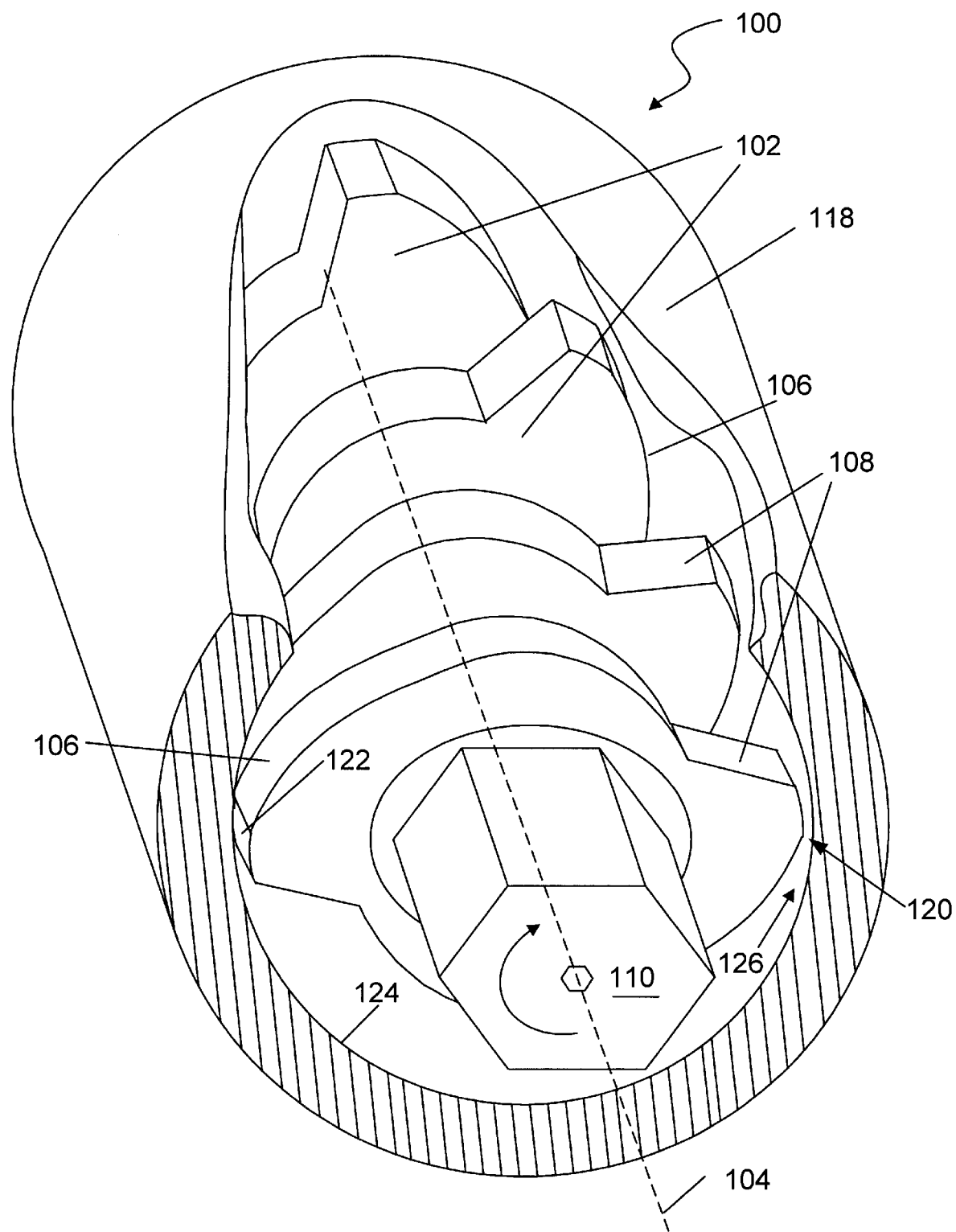
FIG. 12 shows a perspective view of a screw extruder of which a portion of the barrel has been cut away, including dispersion disks of the present invention.

FIG. 12 shows such a version of the preferred embodiment 100 in which dispersion disks 102 having a ninety degree helix angle have been fixedly stacked upon a central shaft 110. A portion of the barrel 118 has been cut away to show the orientation of the disks 102. A central longitudinal axis 104 has again been included for easy reference. Elongational and shear stress necessary for good dispersive mixing are produced in the high stress regions 120 between the paddle tips 122 and the barrel inner surface 124. The main dispersive mixing action will occur in the narrowing region formed by the pushing flight face 106 and the inner barrel surface 124. Material is forced into the progressively narrowing passage 126 by drag flow caused by the relative motion between the screw and the barrel surface 124.

Figures 13, 14:
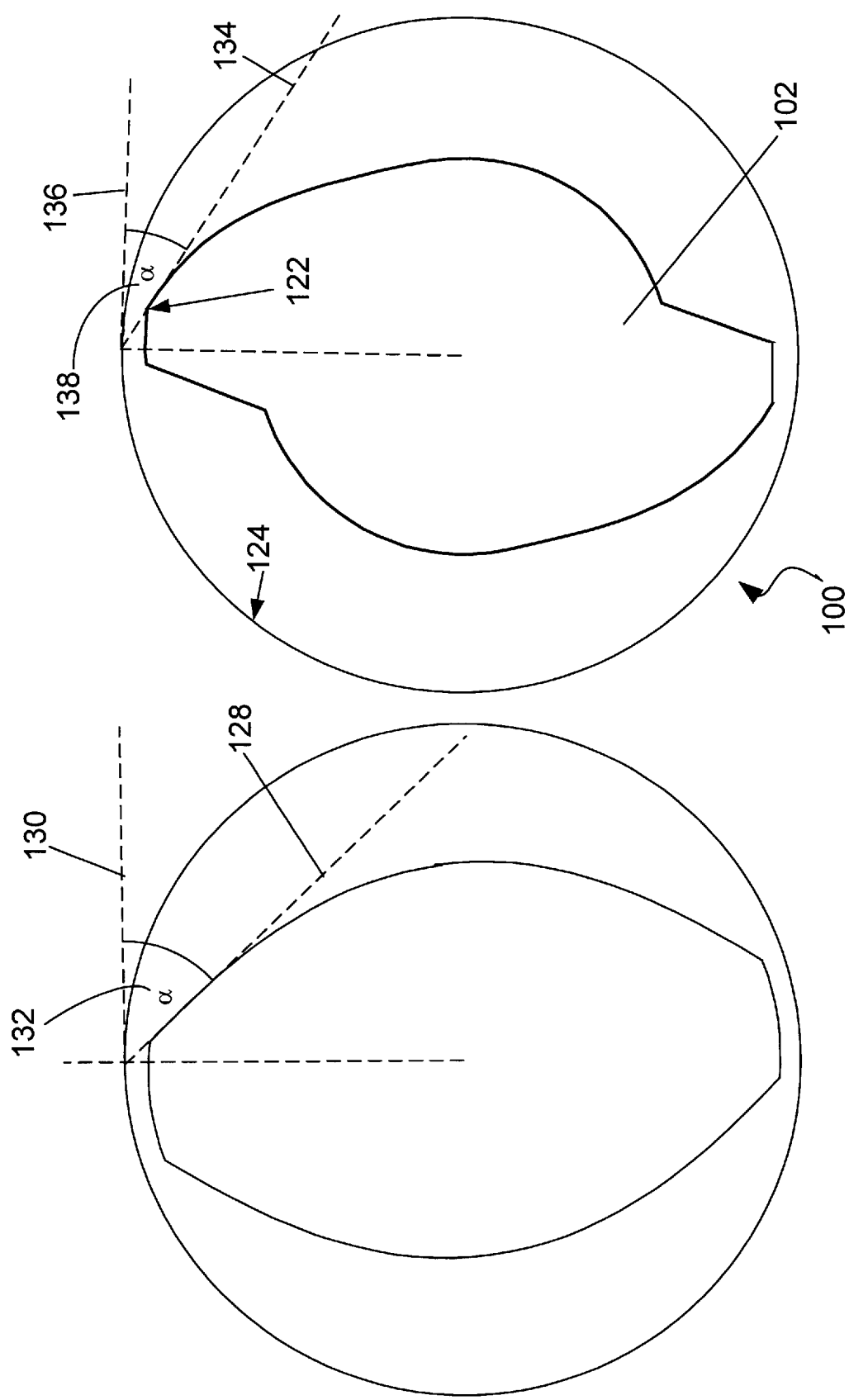
FIG. 13 illustrates a side view of prior art kneading paddles including approach angle $\alpha$.
FIG. 14 shows a side view of the dispersion disks of the present invention, including approach angle $\alpha$.

FIG. 13 PRIOR ART and FIG. 14 show a comparison of the profiles of the prior art and the dispersion disks of the present invention. In FIG. 13, a prior art kneading paddle in a barrel of a screw extruder is illustrated with line 128 drawn tangent to the surface of the paddle at the tip. A second line 130 is drawn tangent to the point on the barrel's inner surface which intersects the projection of line 128. The two lines 128 and 130 define an angle α which is designated as 132. The geometry of the kneading paddle is constrained by the necessity of mating with a second paddle whereby the tip of the first paddle wipes the second and thereby traces the required contour. Angle α 132, which defines the entrance angle to the passage past the tip, is severely limited by this design constraint, and is not optimized for dispersion of material.

In contrast, the profile of a preferred embodiment of present invention 100 is shown in FIG. 14. A dispersion disk 102 is illustrated in the bore 124 of a screw extruder 10. A line 134 is shown tangent to the disk's surface near the tip 122. As before, a second line 136, tangent to the projected point on the barrel's inner surface 124, defines an angle α 138. Since the geometry of the dispersion disk 102 is not dictated by the necessity to trace the outline of an adjacent paddle, the angle α 138 can be much more acute and can be designed to produce excellent dispersion of the material. It is anticipated that this angle α 138 will lie in the range of zero to 35°, while the typical angle α 132 found in prior art kneading paddles from twin screw extruders is 35° to 50°. By way of comparison, this corresponding approach angle α in prior art single screw extruders is typically 90°, since there is no progressively narrowing passage provided.

While the material is forced all the way into a progressively narrowing passage, and through it, dispersive mixing action will be efficient. However, the polymer melt will have a tendency to bypass the high stress regions and take the path of least resistance by flowing around them as can be seen in FIG. 15A & B.

Figures 15A, 15B, 16A, 16B:
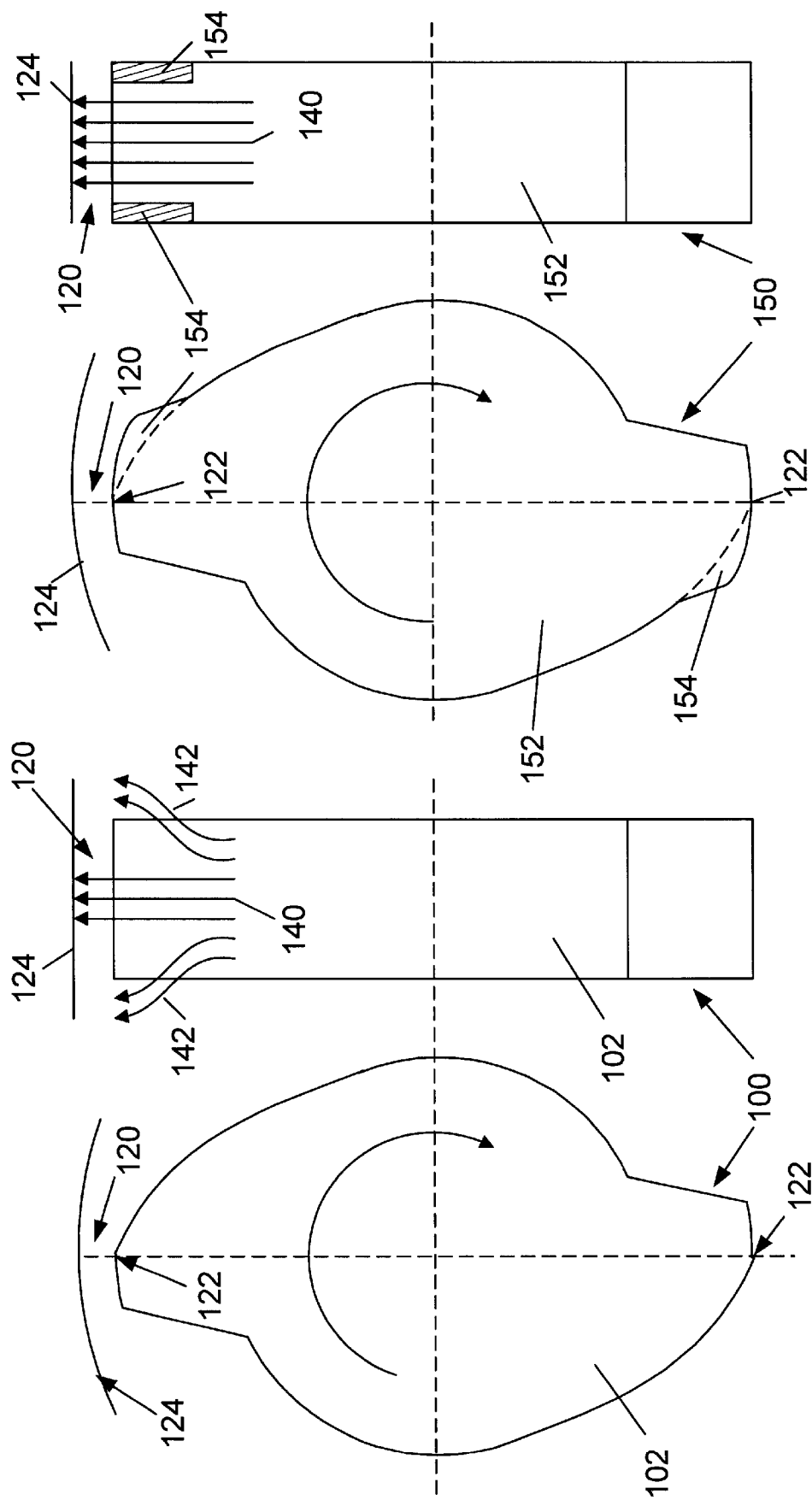
FIGS. 15A & B show front and side plan views of a dispersion disk of the present invention.
FIGS. 16A & B show front and side plan views of a further embodiment of a dispersion disk of the present invention.

In FIG. 15A, a dispersion disk 102 is seen in profile as well as a small portion of the barrel's inner surface 124. The high stress region 120 is shown between the disk tip 122 and the barrel's inner surface 124. FIG. 15B shows a front plan view of the same dispersion disk 102 with flow of material 140. Material 142 is shown flowing around the sides of the disk tip 122. This will reduce the efficiency of the dispersive mixing action.

This problem can be greatly reduced by the addition of a barrier wall in the high stress region to close off the bypass route. FIGS. 16A & B show another preferred embodiment 150 of the present invention in which two barrier walls 154 have been added. FIG. 16A shows a side plan view of the modified dispersion disk 152 with barriers 154 at the tips 122. FIG. 16B shows a front plan view of the modified dispersion disk 152 with material flow 140 which is channeled through the high stress region 120. The efficiency of the dispersive mixing is thus enhanced.

Figures 17A, 17B, 18A, 18B:
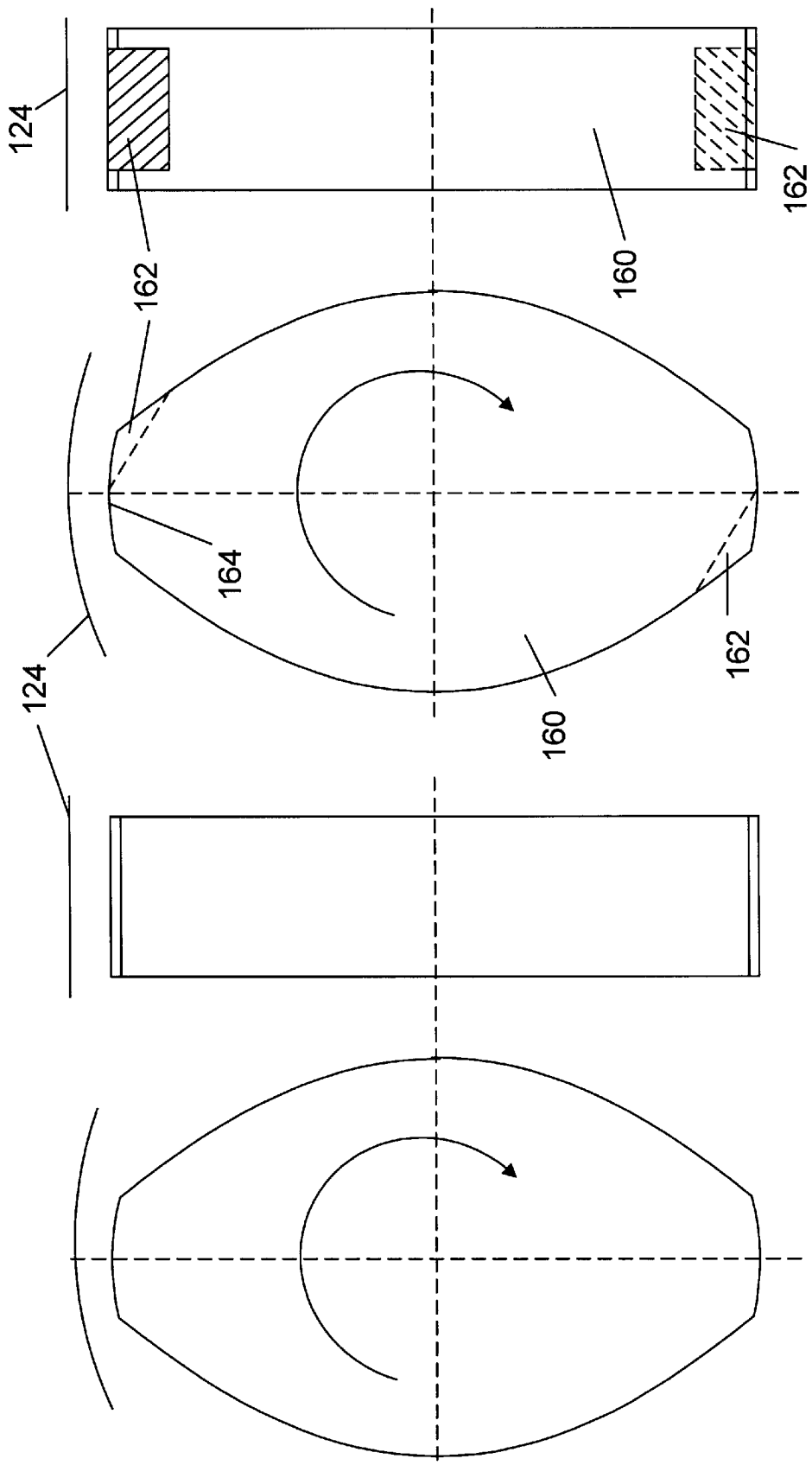
FIGS. 17A & B illustrate front and side plan views of a prior art kneading paddle.
FIGS. 18A & B show front and side plan views of a modified kneading paddle according to the present invention.

This modification can also be used with prior art kneading paddles to improve performance as seen in FIGS. 17A & B and 18A & B. FIG. 17A & B show side and front plan views of a prior art kneading paddle without modifications. FIG. 18A shows a side plan view of a modified kneading paddle 160 which has been improved by means of the present invention. A groove 162, seen in dashed line in FIG. 18A, has been cut into the surface of the paddle 160. FIG. 18B shows a front plan view of the modified paddle 160 with the groove 162 included. This groove 162 can channel material into the region between the tip 164 and the barrel wall 124. Although the paddle's shape is still largely dictated by the tracing of its companion paddle, the region in the groove 162 can be angled differently to improve material dispersion. This is expected to produce improved performance, although it may not reach the efficiency of the dispersion disks 102.

Figure 19:
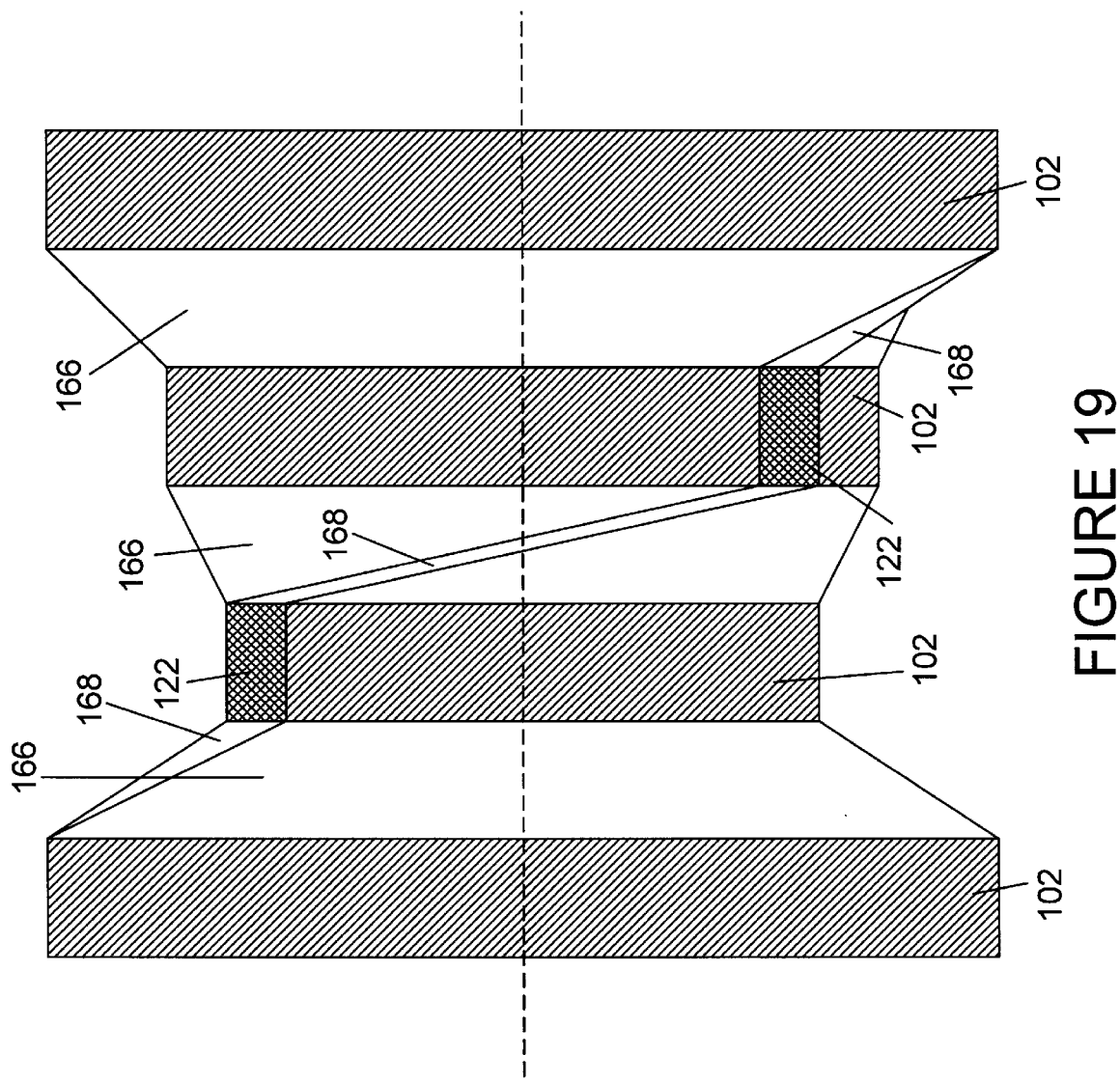
FIG. 19 shows a side plan view of a stack of dispersion disks and interleaved transitional elements according to the present invention.

There is a common problem which exists in regard to mixing elements which have a neutral helix angle, such as both kneading paddles and dispersion disks. This problem is that there may be stagnation points which exist at the transition between the different disks. This condition can be corrected by the use of transition elements between the straight disks. FIG. 19 illustrates one form that transitional elements might take. Dispersion disks 102 are interleaved with one or more transition elements 166. In this version of the preferred embodiment, the transition elements are flighted elements with a helix angle between zero and 90°. These elements 166 may be basically shaped as twisted dispersion disks with the angle of twist equal to the stagger angle 109 (see FIG. 11) of the dispersion disks 102. Transition elements flights 168 are shown connecting the tips 122 of the disks 102. These elements provide a gradual transition from one dispersion disk to another and aid the flow of material while still maintaining the dispersive mixing capability. It is to be understood that these transition disks may also be used with kneading paddles of the prior art to improve material flow.

It should be further understood that the improvements of the present invention can be used in screw extruders that contain multiple screws. Twin-screw extruders can be co-rotating with screws rotating in the same direction, or counter-rotating with screws rotating in the opposite direction. There are also triple-screw extruders, quadruple-screw extruders, and screw extruders with ten screws arranged in a circular pattern. All varieties of screw extruders can benefit from improved dispersive mixing by using the preferred embodiments of the present invention which are presented above. Increasing the number of high stress regions by using flights with the profiles shown above, is a technique that can be useful in any of multiple as well as single screw extruders. Therefore, in addition to the above mentioned examples, various other modifications and alterations of the inventive device/process 10 may be made without departing from the invention. Accordingly, the above disclosure is not to be considered as limiting and the appended claims are to be interpreted as encompassing the true spirit and the entire scope of the invention.

Industrial Applicability

The present screw extruder 10 is well suited generally for application in any mixing process where a solid or liquid ingredient needs to be mixed dispersively in a viscous fluid. This may be the dispersion of solid agglomerates in a viscous fluid or the dispersion of liquid droplets in a viscous fluid. It is particularly well suited for use in mixing blends of polymers or for mixing additives to polymers prior to extrusion forming.

Applications in the polymer field include the dispersion of solid pigments into polymers for making colored plastic products. Particularly where uniformity of color is important, it is very advantageous that the color particles be well mixed dispersively and broken down into smaller agglomerates than may be possible through merely distributive mixing.

The present invention 10 can also be used to improve the dispersion of incompatible polymer components into a polymer matrix to produce polymer blends and alloys. Good dispersive mixing can be important in obtaining uniform material properties such as tensile strength, durability, etc. Reinforcing fillers can be added to a polymer matrix to produce increased stiffness with greater uniformity using the present invention 10.

When manufacturing conductive or semi-conductive materials, the dispersion of conductive fillers in a polymer matrix is enhanced by use of the present invention 10. The dispersion of magnetic fillers in plastic magnets, and dispersion of solid fillers for increased resistance to oxidation can both be improved when using the improved dispersive mixer 10. The present invention 10 is also useful in the manufacture of rubber adhesives.

The viscous fluid to be dispersively mixed does not have to be plastic or polymer based. It is possible to mix food products such as dough, mashed potatoes, cooking oil, a slurry of grapes or fruit concentrates, honey or peanut butter. It can also be petroleum products like oil or rocket fuel, etc. All of these materials may benefit from the improved dispersive mixing which is provided by the present invention 10.

Additionally, since the mixing elements of the present invention can be made to be modular, it is possible to customize configurations for optimum performance with a particular material. The improvements of the present invention 10 may thus also be incorporated into existing screw extruders at reduced cost. Particularly, improvements to prior art kneading paddles may be made by using conventional machining methods to include the improved dispersive groove 162 in existing machines for little cost. For even better performance, dispersion disks 102, which may be manufactured to the same diameter and standard shaft fitting dimensions as the prior art paddles, may replace the kneading paddles.

For the above, and other, reasons, it is expected that the screw extruder 10 of the present invention will have widespread industrial applicability. Therefore, it is expected that the commercial utility of the present invention will be extensive and long lasting.

What is claimed is:

1. A screw extruder comprising:
a barrel, said barrel having a bore defining an inner surface; and
at least one extruder screw, positioned within said bore, each screw including a central shaft and at least one screw flight, each flight including a front pushing face and a rear face, each said front pushing face having a profile which interacts with said inner surface of said barrel to form a progressively narrowing passage through which material is forced into multiple regions of high elongational and shear stress.

2. The screw extruder of claim 1 wherein:
said screw flights are arranged in a helical pattern around said central shaft.

3. The screw extruder of claim 1 wherein:
said profiles of said front pushing faces are selected from the group consisting of elliptical sections, circular sections and triangular sections.

4. The screw extruder of claim 1 wherein:
said extruder screws are twin extruder screws.

5. The screw extruder of claim 4 wherein:
said twin extruder screws rotate in counter directions.

6. The screw extruder of claim 4 wherein:
said twin extruder screws rotate in the same direction.

7. The screw extruder of claim 1 wherein:
said extruder screw further includes distributive mixing means.

8. The screw extruder of claim 7 wherein:
said distributive mixing means are selected from the group consisting of slots in the screw flights, pins on the central shaft, secondary flights, secondary flights with interruptions, changes in channel depth and changes in the channel width.

9. The screw extruder of claim 1 wherein:
said extruder screws include modular sections which are arranged on a central shaft to provide variable mixing characteristics.

10. The screw extruder of claim 1 wherein:
said screw flights are symmetrically arranged about a central shaft to balance deflection forces.

11. The screw extruder of claim 10 wherein:
the number of screw flights is a variable selected from the group consisting of two, three, four, five, and six.

12. The screw extruder of claim 1 wherein:
said extruder screw further includes conveying/wiping flights.

13. A screw extruder comprising:
a barrel, said barrel having a bore defining an inner surface; and
a single extruder screw positioned within said bore, said screw including a central shaft and a plurality of dispersion disks, each dispersion disk further including a front pushing face and a rear face, each said front pushing face having a profile which interacts with said inner surface of said barrel to form a progressively narrowing passage through which material is forced into multiple regions of high elongational and shear stress, said dispersion disk profile further having defined an approach angle $\alpha$ to said progressively narrowing passage, said angle $\alpha$ lying in the range of zero to 35 degrees.

14. The screw extruder of claim 13 wherein:
said extruder screw further includes a plurality of transition elements.

15. The screw extruder of claim 14 wherein:
said transition elements are interleaved with said dispersion disks.

16. The screw extruder of claim 15 wherein:
said transition elements are twisted dispersion disks with the angle of twist equal to the stagger angle of the dispersion disks.

17. The screw extruder of claim 13 wherein:
said dispersion disks further include barrier walls to channel material flow into high stress regions.

18. A screw extruder comprising:
a barrel, said barrel having a bore defining an inner surface; and
a single extruder screw, positioned within said bore, said screw including a central shaft, and a plurality of kneading paddles, each kneading paddle further including a dispersion groove which channels material into a region of high stress.

19. The screw extruder of claim 18 wherein:
said extruder screw further comprises a plurality of transition elements.

20. A screw extruder comprising:
a barrel having a bore defining an inner surface; and
at least one extruder screw positioned within said bore, each screw including a central shaft and at least one fluted mixing section, each fluted mixing section having at least one inlet channel and at least one outlet channel separated by a plurality of barrier flights which act to force material through regions of elongational and shear stress.

21. A method of extruding material from a screw extruder comprising the steps of:
providing a screw extruder including a barrel having input and output ends, a bore defining an inner surface, and an extrusion die at said output end;
at least one extruder screw positioned within said bore, each screw including a central shaft and at least one screw flight, each flight including a front pushing face and a rear face, each front pushing face having a profile which interacts with said inner surface of said barrel to form a progressively narrowing passage through which material is forced into multiple regions of high elongational and shear stress;
introducing extrusion material into said input end of said barrel;
rotating said screws to mix said material dispersively and distributively;
conveying said material towards said extrusion die at said output end to be shaped; and,
extruding said extrusion material from said extrusion die.

22. The method for extruding material from a screw extruder of claim 21 wherein:
said profiles of said front pushing face portions are selected from a group consisting of elliptical sections, circular sections and triangular sections.

23. A screw extruder comprising:
a barrel having a bore defining an inner surface;
at least one extruder screw having a screw diameter D, said screw being positioned within said bore, each screw including a central shaft, a mixing section having a mixing section length L, and at least one screw flight, each flight including a front pushing face, a rear face and a flight tip having a flight width $w_f$, the profile of each said front pushing face acting with said inner surface of said barrel to form a progressively narrowing passage through which material is forced into multiple regions of high elongational and shear stress;

said screw flights being arranged in a helical pattern around said central shaft and having defined a helix angle $\phi$;

said screw extruder having a channel depth H defined as the distance between said central shaft and said bore inner surface, a radial flight clearance $\delta$ defined as the distance between said flight tip and said bore inner surface, and a flight clearance/channel depth ratio $\delta/H$; and for a range of $\delta/H$ of 0.05–0.5, mixing section length L lies in the range 1–20 times the screw diameter D, the helix angle $\phi$ lies in the range from $-90°$ to $-30°$ and $+30°$ to $+90°$, and the flight tip width $w_f$, lies in the range 0–0.5 times the channel width.

24. The screw extruder of claim 23 wherein:

said screw extruder further has defined a ratio of radial flight clearance to screw diameter $\delta/D$, where said $\delta/D$ lies in the range of 0.005–0.250.

* * * * *